United States Patent
Fuchs et al.

(10) Patent No.: US 8,447,447 B2
(45) Date of Patent: May 21, 2013

(54) ACTUATION SYSTEM FOR A DRIVE UNIT OF A MOTOR VEHICLE

(75) Inventors: Detlef Fuchs, Ludwigsburg (DE);
Lothar Rehm, Herrenberg (DE);
Thomas Von Raumer, Stuttgart (DE)

(73) Assignee: Daimler AG, Stuttgart (DE)

( * ) Notice: Subject to any disclaimer, the term of this patent is extended or adjusted under 35 U.S.C. 154(b) by 684 days.

(21) Appl. No.: 12/376,764

(22) PCT Filed: Aug. 6, 2007

(86) PCT No.: PCT/EP2007/006930
§ 371 (c)(1),
(2), (4) Date: May 7, 2010

(87) PCT Pub. No.: WO2008/017441
PCT Pub. Date: Feb. 14, 2008

(65) Prior Publication Data
US 2011/0130900 A1   Jun. 2, 2011

(30) Foreign Application Priority Data
Aug. 9, 2006 (DE) .................. 10 2006 037 125

(51) Int. Cl.
*G06F 17/00* (2006.01)
(52) U.S. Cl.
USPC .............................. 701/22; 903/903; 180/216
(58) Field of Classification Search ...... 701/22; 903/903; 180/165, 199, 216
See application file for complete search history.

(56) References Cited

U.S. PATENT DOCUMENTS

| | | | |
|---|---|---|---|
| 4,534,025 A * | 8/1985 | Floyd ......................... 370/449 |
| 5,880,568 A | 3/1999 | Bederna et al. |
| 5,954,407 A | 9/1999 | Schramm et al. |
| 5,969,919 A | 10/1999 | Kobayashi et al. |
| 6,015,193 A | 1/2000 | Vogel et al. |
| 6,232,674 B1 | 5/2001 | Frey et al. |
| 6,345,225 B1 | 2/2002 | Böhm et al. |
| 7,584,333 B2 | 9/2009 | Ito |

FOREIGN PATENT DOCUMENTS

| | | |
|---|---|---|
| DE | 44 38 714 A1 | 5/1996 |
| DE | 195 10 525 A1 | 9/1996 |
| DE | 196 45 944 A1 | 5/1998 |
| DE | 198 32 167 A1 | 5/1999 |

(Continued)

OTHER PUBLICATIONS

Transmittal of International Search Report and Written Report (total pages: 20, including translation of portions thereof).

*Primary Examiner* — Gertrude Arthur Jeanglaude
(74) *Attorney, Agent, or Firm* — Crowell & Moring LLP

(57) ABSTRACT

The invention relates to an actuation system for a drive unit of a motor vehicle, having has a drive control unit which is assigned to the drive unit and which has a function level and a function monitoring level. A (4), a first data transmission device (5) which is arranged in the function level (3), of the drive control unit and is connected to a separate external control unit via a first communication path via which a predefined setpoint torque (Msoll) can be forwarded from the external control unit to the first data transmission device. In addition, the drive control unit also has a second data transmission device which is likewise additionally connected to the external control unit via a second communication path. The same predefined setpoint torque can also be forwarded from the external control unit to the second data transmission device via the second communication path.

13 Claims, 1 Drawing Sheet

FOREIGN PATENT DOCUMENTS

| | | |
|---|---|---|
| DE | 102 40 669 A1 | 3/2004 |
| DE | 103 59 875 A1 | 7/2005 |
| EP | 0 754 611 A1 | 1/1997 |
| EP | 1 231 121 A2 | 8/2002 |
| JP | 5-63706 A | 3/1993 |
| JP | 9-58458 A | 3/1997 |
| JP | 11-98888 A | 4/1999 |
| JP | 2001-523619 A | 11/2001 |
| JP | 2005-250894 A | 9/2005 |
| WO | WO 01/43360 A1 | 6/2001 |

* cited by examiner

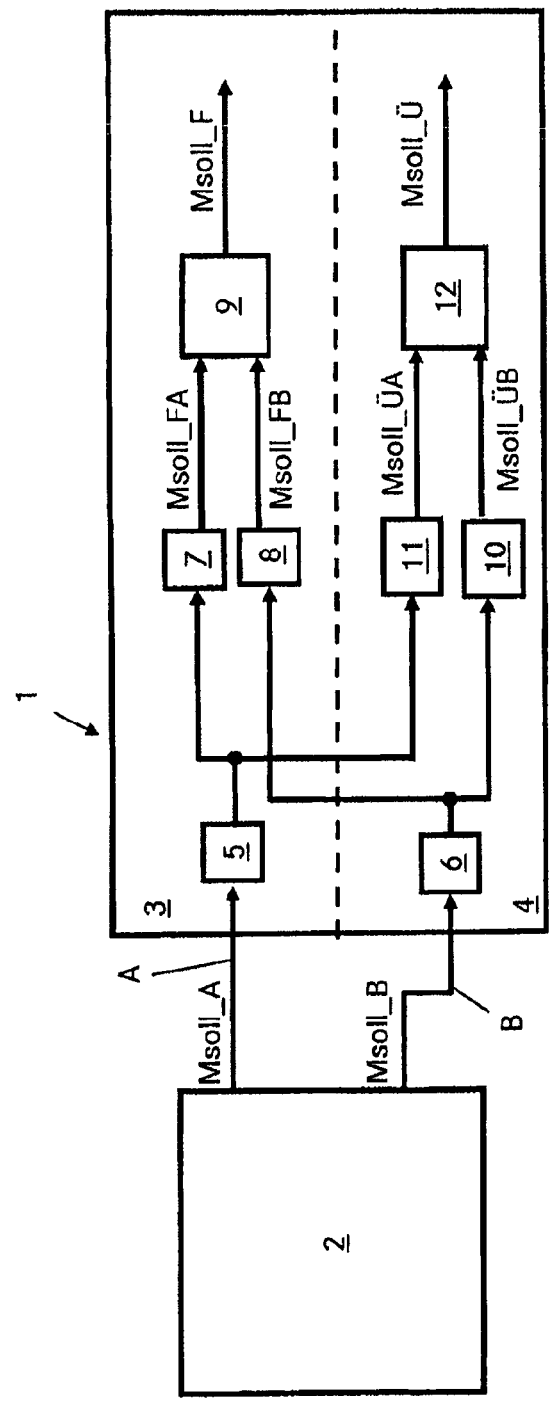

ACTUATION SYSTEM FOR A DRIVE UNIT OF A MOTOR VEHICLE

This application is a continuation of PCT International Application No. PCT/EP2007/006926, filed Aug. 6, 2007, which claims priority under 35 U.S.C. §119 to German Patent Application No. 10 2006 037 124.0, filed Aug. 9, 2006, the entire disclosure of which is herein expressly incorporated by reference.

BACKGROUND AND SUMMARY OF THE INVENTION

The invention relates to an actuation system for a drive unit of a motor vehicle.

The control units of an actuation system for a drive unit are generally monitored at three levels. Such control is disclosed, for example, in German patent document DE 44 38 714 A1, in which the drive power of a vehicle is controlled by a microcomputer with at least two independent levels. A first level carries out the control functions and a second level carries out the monitoring functions. A third level forms a control level which controls the monitoring level and therefore the microcomputer.

One object of the present invention is to provide a highly available actuation system.

This and other objects and advantages are achieved by the actuation system according to the invention, in which the drive control unit has a second data transmission device, and is also connected to the external control unit via a second communication path. A predefined setpoint torque can be forwarded from the external control unit to the second data transmission device via the second communication path.

This arrangement has the advantage that in the event of a failure of one of the communication paths, a second communication path is still available for transmitting data. It therefore increases the availability of the actuation system.

In one embodiment, when a fault is detected in the data transmission of a data transmission device by the drive control unit, and the fault is present for less than a predefined time period, the last fault-free data of this data transmission device can be retained. Changes in the predefined setpoint values do not usually take place in an irregular fashion. For this reason, retaining the old value constitutes a good approximation of a missing value for short interruptions. It is therefore possible to compensate short-term faults without resorting to the data of the other communication path.

In one embodiment, when the drive control unit detects a fault in the data transmission by a data transmission device, the data of the respective other data transmission device can be transferred if the fault is present for longer than a predefined time period. Since the same data are transmitted in both data transmission devices, the data of one data transmission device which are transmitted incorrectly can be replaced by the data of the other data transmission device. The quality of the data is therefore ensured even if one of the data transmission devices fails.

According to another embodiment, when the drive control unit detects a fault in the data transmission of both data transmission devices, a setpoint torque with the value zero can be predefined if the fault is present for longer than the predefined time period. This ensures that the drive unit is operated in a permitted, safe state.

According to a further feature of the invention, a fault signal can be stored in the drive control unit, which permits the fault to be signaled to the driver and/or detected and eliminated within the scope of an external diagnosis by servicing personnel.

In another embodiment, this state can be retained until the next restart of the drive. It is therefore possible, given persistently occurring faults, to operate the system in a safe state continuously up to the next restart, and to signal the fault. This avoids an undefined state occurring.

In a further embodiment, each of the two communication paths can be assigned a separate identifier on the basis of which it is possible to detect via which communication path a setpoint torque of the control unit has been transmitted. It is therefore possible to assign to the data the communication path over which said data have been fed to the control unit. This facilitates later evaluation.

In a still further embodiment, the same setpoint torque can be transmitted with the same message frequency to the assigned data transmission device via both communication paths. This facilitates the synchronized reconciliation of the data of the two communication paths and the detection of faults.

According to another embodiment, the same setpoint torque can be transmitted with the same message counter and the same checksum, to the assigned data transmission device, via both communication paths. This also facilitates the synchronized reconciliation of the data of the two communication paths and improves the detection of faults.

According to yet another embodiment, the second data transmission device is arranged in the function monitoring level, so that it is possible to continue the transmission of data even if one of the levels, the function level or the function monitoring level, has a data transmission fault.

Finally, according to a further embodiment, the data of the two data transmission devices can be evaluated in parallel with one another, by the drive control unit. It is therefore possible to continue the data transmission even if one of the levels, the function level or the function monitoring level, is operating incorrectly.

Other objects, advantages and novel features of the present invention will become apparent from the following detailed description of the invention when considered in conjunction with the accompanying drawings.

BRIEF DESCRIPTION OF THE DRAWINGS

FIG. 1 shows an embodiment of the actuation system according to the invention.

DETAILED DESCRIPTION OF THE DRAWINGS

All the devices and other components of the control unit which are illustrated in FIG. 1 can be embodied equally well as an electronic component, as a functionality or memory area of a computer module, as a software or the like.

FIG. 1 shows a drive control unit 1 of a drive unit and a second separate, external control unit 2. The drive control unit 1 is assigned to and controls a drive unit (not illustrated). The drive unit may be, for example, an electric machine, an internal combustion engine or the like. The drive control unit 1 has a function level 3 and a function monitoring level 4.

The external control unit 2, which may be, for example, a central drive control unit for coordinating a plurality of drive units (hybrid control unit), the vehicle control unit or the control unit of an internal combustion engine, is connected to the drive control unit 1 via two communication paths A and B.

The drive control unit 1 has two data transmission units 5 and 6, which are arranged, respectively, in the function level 3 and in the function monitoring level 4. The communication path A connects the external control unit 2 to the data transmission unit 5 of the function level 3 of the drive control unit 1, while communication path B connects the external control unit 2 to the data transmission unit 6 of the function monitoring level 4 of the drive control unit 1.

The external control unit 2 transmits identified setpoint torque values Msoll to the drive control unit 1 of the drive unit via the communication paths A and B. Information indicating over which of the communication paths (A or B) the transmitted setpoint torque Msoll has been transmitted is added to the setpoint torque Msoll in each case. Correspondingly, in FIG. 1 the setpoint torque is characterized as Msoll_A and Msoll_B, respectively.

The setpoint torque Msoll is transmitted on the two communication paths A and B with the same clocking frequency and with assignment of the same message counter. In each case a checksum is assigned to the setpoint torque Msoll_A and Msoll_B, respectively. It is therefore possible to assign identical values for the setpoint torque Msoll, transmitted in parallel and simultaneously on the communication paths A and B, by virtue of the fact that the message counter corresponds and the checksums are identical to one another.

The setpoint torque Msoll_A, which is transmitted via the communication path A, is forwarded from the data transmission device 5 to a device 7 of the function level 3 and a device 11 of the function monitoring level 4, while the setpoint torque Msoll_B transmitted via the communication path B is forwarded by the data transmission device 6 to a device 8 of the function level 3 and a device 10 of the function monitoring level 4. A device 9 of the function level 3 compares the data of the device 7 and the device 8 with one another. In the process it is checked whether the data from communication path A and communication path B are at update state. This is the case if the message counter has the same value for the data of communication path A and the data of communication path B. Furthermore it is checked whether in each case the checksum is correct and corresponds to that of the data of the other communication path. Subsequently, the setpoint torque Msoll_F which is to be output by the device 9 of the function level 3 is acquired.

A fault is detected if a message has been lost, the checksum is incorrect, or a fault has been detected in the message counter (value of the message counter is the same as that of the last message or greater by more than one). Lost messages lead to a reversible fault reaction, and a fault in the checksum or in the message counter leads to an irreversible reaction which is maintained until the next time the engine is started.

The acquisition of torque in the function level 3 is illustrated in the following table:

| Fault in A? | Fault in B? | Msoll_FA | Msoll_FB | Msoll_F |
|---|---|---|---|---|
| No | No | Positive | Positive | Min [Msoll_FA, Msoll_FB] |
| No | No | Negative | Negative | Max [Msoll_FA, Msoll_FB] |
| No | No | Positive | Negative | Zero |
| No | No | Negative | Positive | Zero |
| No | Yes | Equal | Fault | Msoll_FA (fault signal for Msoll_FB) |
| Yes | No | Fault | Equal | Msoll_FB (fault signal for Msoll_FA) |
| Yes | Yes | Fault | Fault | Zero |

If there are no transmission faults in the communication path A or B and if the two setpoint torques Msoll_FA and Msoll_A have the same sign, the device 9 outputs the lower of the two values. If both values are positive, this corresponds to the minimum Min [Msoll_FA, Msoll_FB] of the values for the setpoint torque. If both values are negative, this corresponds to the maximum Max [Msoll_FA, Msoll_FB] of the values for the setpoint torque.

If there is no transmission fault present but the two setpoint torques Msoll_FA and Msoll_A have a different sign, the device 9 outputs a setpoint torque Msoll_F with the value zero.

If a transmission fault is present in one of the communication paths A or B, the device 9 or the device 7 or 8 arranged upstream thereof transfers the last value which was transmitted in a fault-free fashion on the respective communication path A or B if the fault does not last for longer than a predefined time period (debouncing time).

If a transmission fault is present in one of the communication paths A or B, and lasts for longer than the predefined debouncing time, the device 9 outputs the setpoint torque Msoll_A or respectively Msoll_FA of the other, fault-free communication path B or respectively A as a setpoint torque Msoll_F.

If there is a transmission fault in both transmission paths A and B, the device 9 outputs a setpoint torque Msoll_F with the value zero.

In a device 12 of the function monitoring level 4, the data of the device 10 and of the device 11 are compared with one another. In the process, the message counter is used to check whether the data from communication path A and the data from communication path B have the same update state. Furthermore, it is checked whether the checksums are correct and correspond.

The acquisition of torque in the function monitoring level 4 corresponds to that in the function level 3 and is therefore not explained again in detail.

The acquisition of torque in the function monitoring level 4 corresponds to that in the function level 3 and is therefore not explained again in detail.

In this way, the two communication paths A and B in the function level 3 and the function monitoring level 4 are evaluated in parallel with one another. This both improves the detection of faults and the fault compensation possibilities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An actuation system for a drive unit of a motor vehicle, the actuation system comprising:
    a separate external control unit; and
    a drive control unit assigned to the drive unit, wherein said drive control unit comprises
        a function level that includes a first data transmission device, wherein the first data transmission device is connected to the separate external control unit via a first communication path by which a predefined setpoint torque is forwarded from the external control unit to the first data transmission device; and
        a function monitoring level that includes a second data transmission device, wherein the second data transmission device is connected to the separate external control unit via a second communication path by which the predefined setpoint torque is forwarded from the external control unit to the second data transmission device;

wherein the drive unit provides drive power to move the motor vehicle based on the predefined setpoint torque.

2. The actuation system as claimed in claim 1, wherein when a fault is detected in the data transmission of, one of said first or second data transmission devices by means of the drive control unit, which fault is present for less than a predefined time period, the last fault-free data of this one data transmission device can be retained.

3. The actuation system as claimed in claim 1, wherein when a fault is detected in the data transmission of one of said first and second data transmission devices by the drive control unit, the data of the other data transmission device can be transferred, if the fault is present for longer than a predefined time period.

4. The actuation system as claimed in claim 3, wherein, when a fault is detected in the data transmission of both data transmission devices by the drive control unit, a setpoint torque with the value zero can be predefined, if the fault is present for longer than the predefined time period.

5. The actuation system as claimed in claim 3, wherein a fault signal can be stored in the drive control unit.

6. The actuation system as claimed in claim 5, wherein the fault signal can be retained until a next restart of the drive.

7. The actuation system as claimed in claim 1, wherein each of the two communication paths can be assigned a separate identifier by which it is possible to determine the communication path a setpoint torque of the control unit has been transmitted.

8. The actuation system as claimed in claim 1, wherein the same setpoint torque can be transmitted with the same message frequency to the respectively assigned data transmission devices via both communication paths.

9. The actuation system as claimed in claim 1, wherein the same setpoint torque can be transmitted with the same message counter and the same checksum to the respective data transmission devices via both communication paths.

10. The actuation system as claimed in claim 1, wherein the second data transmission device is arranged in the function monitoring level.

11. The actuation system as claimed in claim 1, wherein data of the two data transmission devices are evaluated in parallel with one another by the drive control unit.

12. The actuation system as claimed in claim 1, wherein the drive unit is an electric machine.

13. The actuation system as claimed in claim 1, wherein a plurality of drive units are provided.

* * * * *